April 21, 1942.   D. C. DRILL   2,280,388
MEANS FOR APPLYING AN ADHESIVE COATING TO
NEWLY FORMED MINERAL WOOL FIBERS
Filed May 27, 1939
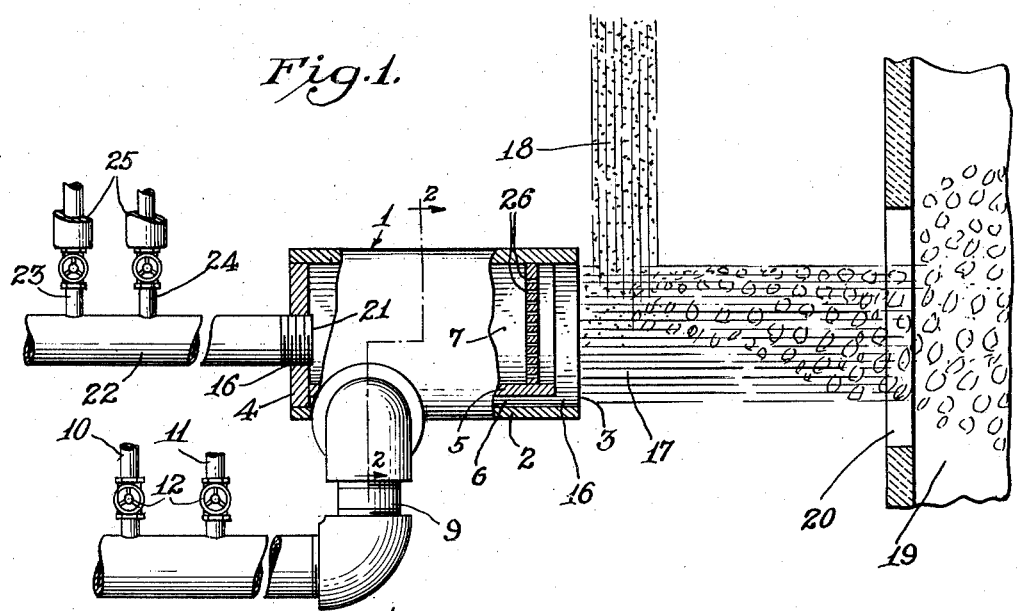
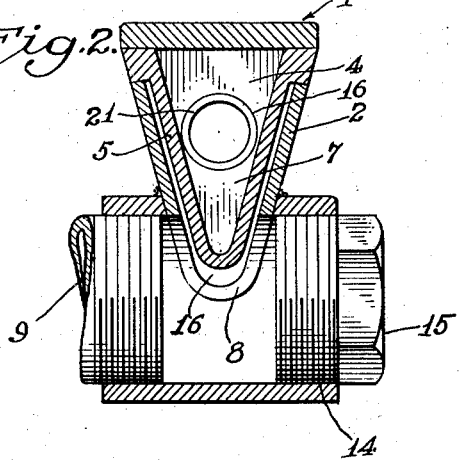 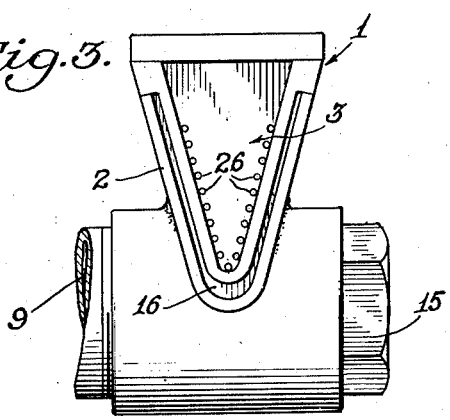
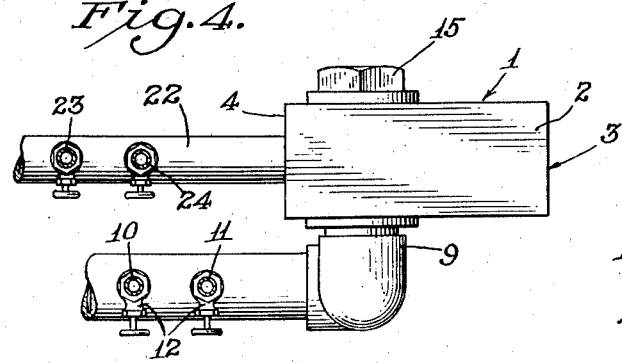
Inventor
Daniel C. Drill
BY
Carlton C. Davis
Attorney.

Patented Apr. 21, 1942

2,280,388

UNITED STATES PATENT OFFICE 2,280,388

MEANS FOR APPLYING AN ADHESIVE COATING TO NEWLY FORMED MINERAL WOOL FIBERS

Daniel C. Drill, Wabash, Ind., assignor to American Rock Wool Corporation, Wabash, Ind., a corporation of Indiana Application May 27, 1939, Serial No. 276,255

7 Claims. (Cl. 299—140)

This invention relates to a means for applying an adhesive coating to newly formed mineral wool fibers in the production of blankets, batts, and the like.

Mineral wool fibers are commonly formed by discharging molten mineral materials upon a powerful blast of steam which rapidly shreds the molten materials into myriads of glasslike fibers and hurls these fibers into a blow chamber which is preferably provided with a continuously movable floor or conveyor upon which the fibers slowly settle in suspension in the highly heated atmosphere of the blow chamber. The deposition of the fibers on the moving floor of the blow chamber forms an elongated blanket which is carried out of the blow chamber on the conveyor and which, after being lightly compacted, is cut into smaller blankets, batts, or the like.

These fibers are inherently fragile, brittle, and tacky, and once they have been incorporated in the blanket forming on the conveyor, they cannot be separated from each other without breaking a large proportion of the fibers. On the other hand, the untreated fibers are not sufficiently bonded together to prevent the blanket or batt from being materially injured or destroyed by the manipulations incidental to their shipment and use.

Furthermore, the untreated fibers form a porous body which is especially adapted to serve as filtering material but is unsuitable for use as water resistant heat insulating material. Under certain atmospheric conditons the untreated blanket or batt tends to collect water by condensation which destroys or greatly reduces the original heat insulating value of these fibrous bodies. The above mentioned inherent characteristics of mineral wool fibers make it necessary to apply a suitable adhesive substance or substances to these fibers in the making of mineral wool batts or the like designed to be used for heat insulation purposes.

The adhesive used should render the blanket or batt waterproof or at least highly water resistant and should also prevent the fibers in the blankets or batts from settling after they have once been installed in position. In order to obtain an adhesive coating having these desired characteristics it is frequently desirable to simultaneously apply two or more adhesive substances.

Long experience has taught that these adhesive substances should be applied with the fiery blast of formation, and it is a common practice to dissolve the adhesives in a suitable solvent and inject these adhesives in the steam line or in the blow cap out of which the blast issues.

The employment of solvents, however, has definite disadvantages. The solvents used are volatile at the temperatures existing in the blow chamber and some of the solvents, under certain conditions, are highly explosive. Furthermore, the solvents are lost through the ventilator of the blow chamber or evaporate in the blankets or batts. For this reason their employment appreciably increases the cost of the finished product.

Numerous attempts have, therefore, been made to avoid the employment of solvents. The majority of the adhesives employed are of such a character that they can be melted, and in an attempt to provide a solution for this problem these adhesives were heated in steam jacketed reservoirs through which the steam providing the blast of formation was passed. Unfortunately, however, the pressure of this steam ranges from eighty to one hundred twenty-five (125) pounds per square inch, and the temperature of steam at this pressure is insufficient to heat the reservoir to thoroughly melt and liquefy the resins, gums, and asphalts which are adapted to be used for this purpose. These adhesives preferably have a relatively high melting point for the reason that the adhesives employed should not only bond the fibers together but should also prevent the fibers from settling when the bonded fibrous material is subjected to a temperature up to 150° F. These high melting point adhesives, however, are readily melted by the employment of superheated steam, but, unfortunately, when the adhesives are injected into the steam line providing the blast of formation, it has been found that these adhesives are chilled by the relatively cool steam to such a degree that they either clog up the steam line or are blown out of the blow cap in a lumpy or partially unmelted condition. The chilled semi-molten materials will not, of course, separate evenly upon the surfaces of the fibers.

Some attempts have been made to superheat the steam providing blast of fiber formation, but the cost of superheating the large amount of steam required for this purpose adds materially to the financial cost of the product, which is sold in a highly competitive market.

As a matter of fact, it requires approximately one and one-half tons of steam to shred one ton of mineral wool, and the cost of providing the additional heat energy and apparatus necessary to superheat this amount of steam is considered by many manufacturers to be prohibitive.

It is an object of my invention to provide an efficient apparatus for and an economical and highly satisfactory method of applying adhesives to the mineral wool blast of formation.

It is a further object of my invention to provide a means for simultaneously applying two or more adhesive substances which are mutually reactive to each other, such as, for instance, rosin and sodium silicate. These adhesives (as is fully set forth in my joint Patent No. 2,124,768) due to their mutually reactive character, form granular or lumpy precipitates a very short time after being intermixed together. These granular or lumpy precipitates tend to stick to and clog up the steam pipe line and the blow cap. Furthermore, the precipitated material will not spread evenly upon the fibers in such a manner as to provide the necessary adhesive coating. For this reason substances of this character should never be mixed together in a common reservoir when these substances are to be used as adhesive material for bonding the fibers of mineral wool. It has been found, however, that two or more of these adhesive substances may be mixed together a fraction of a second before they are discharged in the blow chamber.

A further object of my invention is to provide a blow cap which is adapted to reduce the wobbling of the lava stream caused by the extremely variable partial vacuum induced by the steam blast of fiber formation issuing from the nozzles of steam blow caps. As the steam issues from the conventional blow cap (which usually has a vertically extending front wall portion), the steam blast draws the air away from the face of the blow cap and thereby produces a highly variable partial vacuum which frequently has sufficient force to draw the lava stream backward against the front portion of the blow cap. When this occurs, the lava immediately chills and adheres to the blow cap in such a manner as to prevent the proper operation of the blow cap. Furthermore, this lava often partially melts the blow cap, and, in this event, the old blow cap must be removed and a new cap must be attached to the steam pipe line.

In order to make this exchange of blow caps when the plant is in operation, the steam blast must first be cut off. When this is done, the lava stream which was being blown into the blow chamber falls from the cupola upon the floor and forms a pool of lava immediately below the blow cap. Under these conditions it is quite apparent that it is both difficult and dangerous to unscrew the old blow cap and screw on the new blow cap.

Even if the blow cap is not melted the chilled lava adhering to the blow cap must be broken up, and as this is done a number of broken pieces of lava are hurled by the steam blast into the blow chamber and become incorporated with the mineral wool blanket forming on the floor of the blow chamber. These broken pieces, of course, not only reduce the insulating value of the mineral wool products, but often cut the hands of those who pack the batt in the recesses of the building or structure in which the batts are to be placed.

It is among the objects of this invention to provide a blow cap which is adapted to substantially eliminate the before mentioned partial vacuum which sucks the lava backward on the blow cap.

The further objects and purposes of my invention will become apparent from the accompanying drawing and the following description and claims.

In the drawing:

Figure 1 is a partly sectional, partly side elevational view showing the apparatus of my invention;

Figure 2 is a section taken along the line 2—2 of Figure 1;

Figure 3 is a front end view of the portion shown in Figure 2; and

Figure 4 is a top plan view of the apparatus shown in Figure 1.

In applying adhesive according to this invention simultaneous use is made of two separate steam blasts. One of these blasts is the blast of fiber formation which shreds a stream of descending lava into mineral wool fibers and hurls the newly formed fibers into an adjacent blow chamber.

This blast of fiber formation may be discharged under pressure ranging from fifty to one hundred twenty pounds per square inch. As has been previously mentioned, however, the temperature of steam at these pressures is not sufficient to maintain molten adhesives (of the type ordinarily employed to bind mineral wool fibers together) in the highly molten condition at which they are most efficiently discharged from the blow cap. In order to more efficiently discharge these adhesives, a high temperature but relatively small steam blast is provided into which has been previously discharged the molten adhesive or adhesives which are to be applied to the mineral wool fibers. The temperature of the steam providing this high temperature blast may range from approximately 400° F. up to as high as 600° F.

Each of these blasts may, of course, be discharged through separate blast nozzles, but it is considered preferable to use a single blast nozzle which is adapted to simultaneously receive and discharge both the low temperature and the high temperature steam.

A blast nozzle or a blow cap 1 which is particularly adapted to be used for this purpose is shown in the accompanying figures operatively connected to conduits through which the steam and adhesives are fed to the blow cap.

This blow cap is provided with a metal casing 2 which is preferably triangular in cross section and has a front wall portion 3 and a rear wall portion 4. This casing is longitudinally divided by any suitable wall or partition 5 into a lower low pressure steam chamber 6 and an upper high pressure steam chamber 7. This wall portion 5 is preferably V or U-shaped in cross section, but it may, of course, be otherwise formed in any manner which divides the blow cap into the longitudinally extending upper chamber 7 and the longitudinally extending lower chamber 6. The lower steam chamber 6 is provided with any suitable low temperature steam inlet 8 which is adapted for operative connection to a low temperature steam conduit 9. The steam conduit 9 is, of course, adapted for operative connection to any suitable low temperature steam supply system (not shown).

To this conduit 9 are operatively connected two adhesive supply conduits 10 and 11, each of which may be connected to any suitable molten or liquid adhesive supply system (not shown). Each of these adhesive supply conduits is preferably provided with any suitable valve 12.

The lower chamber 6 is also provided with an internally threaded circular open portion 14 which is preferably positioned opposite the inlet 8. In operation this opening is closed by an externally threaded plug 15. This open portion is provided for the purpose of inspecting the interior of the lower chamber and removing any obstruction found in this chamber or adjacent portions of the steam conduit 9. This construction also permits the connection of the low temperature steam pipe to either side, while the side opposite the steam pipe is closed by means of the aforementioned pipe plug.

The blow cap is provided below its front wall portion with a preferably U or V-shaped nozzle opening 16 through which a steam blast of formation 17 issues from the lower chamber of the blow cap and is directed against a stream of lava 18 by which the stream of lava is shredded and discharged into an adjacent blow chamber 19 through an opening 20.

The upper chamber 7 is provided with a high temperature steam inlet 21 and which is adapted for operative connection to a high temperature steam conduit 22 forming a portion of a high temperature steam supply system (not shown).

The steam conduit 22 is operatively connected in any suitable manner to two adhesive supply conduits 23, 24. Each of these conduits is preferably covered with any suitable heat insulating material 25 for the purpose of preventing any molten adhesives in these conduits from becoming chilled before they are admitted to the high temperature steam conduit 22. The high temperature steam conduit 22 is also preferably covered with heat insulating material, but this material, for the purpose of clarity, is not indicated in the accompanying figures. The front wall portion 3 of the casing is perforated with a plurality of small openings 26 entering the upper chamber. These openings are provided for the purpose of permitting a number of quite small streams or jets of high temperature steam to issue from the blow cap. These openings are preferably quite small and should not altogether permit the escape of more than a fraction of the volume of steam which issues from the nozzle opening 16.

Each of the before mentioned conduits through which the steam and adhesives are supplied to the blow cap is preferably connected to its respective source of supply by a flexible hose or other movable coupling (not shown). These couplings permit the blow cap to be shifted either vertically or horizontally to the end that the blow cap may always be so located that the steam blast of formation receives the stream of lava close to the nozzle openings in the front wall portion 3. This flexible arrangement is desirable for the reason that the lava stream slowly varies its position from time to time due to changes in the rate in which the raw materials are melted in the cupola or furnace and variations in the temperature and viscosity of the lava stream.

From the above description of the various details of the preferred form of this invention, it is apparent that the apparatus of this invention is adapted not only to provide means for discharging and directing the blast of fiber formation but is also adapted to provide means whereby one or more liquid adhesive substances may be discharged into a mineral wool blow chamber and become coated on the mineral wool fibers.

While this apparatus is especially adapted to apply one or more molten adhesives, it is also adapted to efficiently apply any combination of liquid adhesives and is especially adapted to apply adhesives which are mutually chemically reactive to each other. For example, molten rosin may be injected into the high temperature steam conduit 22 through one of the adhesive supply conduits (23, 24) and sodium silicate may be injected into the low pressure steam conduit 9 through either of the adhesive supply conduits (10, 11). These two adhesives, as has been mentioned above, are mutually chemically reactive to each other and form semi-solid particles if they are left mixed together for a short period of time. In making use of the apparatus of this invention, however, these two adhesives are separately injected into separate steam blasts which hurl them into the steam laden atmosphere of the blow chamber before they can react with each other to any substantial extent. Once in the blow chamber these adhesives quickly become coated on the fibers without the formation of undesired lumps.

It is also obvious that any two or more suitable molten materials may be advantageously applied according to the teaching of this invention. For example, molten asphalt and molten limed rosin containing calcium resinate should preferably be melted in separate containers and be maintained in the molten condition at different temperatures and different viscosities before they are discharged into the settling chamber. It is also apparent that the molten rosin may be injected through one of the adhesive conduits 10, 11, and that the molten asphalt may be injected through one of the adhesive conduits 10—11 into the steam conduit 9. As these adhesives are so injected they are almost immediately blown into the settling chamber without being damaged by the temperature of the high temperature steam blast. It will, of course, be understood that other liquid adhesives other than adhesives which may be melted or are mutually reactive to each other may also be advantageously applied with the apparatus of this invention.

It will, of course, be understood that modifications may be resorted to within the spirit and scope of this invention. For instance, any two suitable adhesives which are in solution or liquid at atmospheric temperatures may be discharged through the low temperature conduit 9, and any two suitable molten adhesives may be discharged through the high temperature conduits.

I claim:

1. In the manufacture of adhesively treated mineral wool fibers shredded from suitable molten materials by a steam shredding blast and treated at the time of formation with adhesively treated steam, a steam blast nozzle means including a rigid recessed body having a longitudinally extending peripheral outer wall, a rear wall, and a longitudinally extending inner partitioning wall included substantially within said outer wall and separating the interior of said body into an outer steam shredding blast conduit and an inner and upper adhesively treated steam conduit, each of said conduits having a separate steam inlet and a separate steam nozzle outlet, the inlet of said steam shredding blast conduit being adapted for operative connection to a source of steam for shredding said molten materials into fibers and the inlet of said adhesively treated steam conduit being adapted for connection to a source of adhesively treated steam for treating said fibers with an adhesive at the time of fiber formation.

2. In the manufacture of adhesively treated mineral wool fibers shredded from suitable molten materials by a steam shredding blast and treated at the time of formation with adhesively treated steam, a steam blast nozzle means including a rigid recessed body having a longitudinally extending peripheral outer wall, a rear wall, and a longitudinally extending inner partitioning wall included substantially within said outer wall and separating the interior of said body into an outer relatively low temperature main steam shredding blast conduit and an inner and upper relatively high temperature adhesively treated steam stream conduit, each of said conduits having a separate steam inlet and separate steam nozzle outlet, the inlet of said steam shredding blast conduit being adapted for operative connection to a source of relatively low temperature steam for shredding said molten materials into fibers and the inlet of said adhesively treated steam stream conduit being adapted for connection to a source of relatively high temperature adhesively treated steam for treating said fibers with adhesives at the time of fiber formation.

3. In blowing apparatus, a blast nozzle means adapted to be used in the production of adhesively treated mineral wool fibers shredded by a main steam shredding blast and treated at the time of formation with a liquid or molten adhesive in a second and adhesively treated steam stream, said blast nozzle means including a recessed body having a longitudinally extending peripheral outer wall approximating triangular in cross section, a rear wall, a front wall and a longitudinally extending substantially U or V-shaped inner wall connected to each of said outer, front, and rear walls and dividing the interior of said recessed body into an outer main steam shredding blast conduit and a longitudinally extending adhesively treated steam stream conduit, said last mentioned conduit being positioned above said first mentioned conduit and being approximately triangular in cross section adjacent to and within said front wall, said main steam shredding blast conduit having a substantially U or V-shaped orifice positioned below said front wall and intermediate of said outer and inner wall and having a steam inlet adapted for operative connection to a suitable source of steam supply, and said adhesively treated steam stream conduit having an inlet adapted for operative connection to a suitable source of supply of steam which is adhesively treated, said front wall being perforated above said U or V-shaped orifice to provide a discharge outlet for said steam stream conduit.

4. In the manufacture of adhesively treated mineral wool fibers shredded from suitable molten materials by a main steam shredding blast and treated at the time of fiber formation with an adhesively treated auxiliary steam blast other than said main steam shredding blast, a steam blast nozzle means comprising a rigid recessed body having a longitudinally extending peripheral outer wall provided with a steam inlet means, a longitudinally extending inner partitioning wall included substantially within said outer wall and separating the interior of said body into an outer main steam shredding blast conduit intermediate of said inner and outer walls and outside of said inner wall and an auxiliary steam shredding blast conduit intermediate of said inner and outer walls and within each of said walls, a rear wall having an auxiliary steam inlet means in communication with said adhesively treated auxiliary steam conduit, each of said conduits having a separate front nozzle portion, said outer and said inner wall forming a portion of each of said blast conduits.

5. In the manufacture of adhesively treated mineral wool fibers shredded from suitable molten materials by a main steam shredding blast and treated at the time of fiber formation with an adhesively treated auxiliary steam blast other than said main steam shredding blast, a steam blast nozzle means comprising a rigid recessed body having a longitudinally extending peripheral outer wall provided with a steam inlet means, a longitudinally extending inner partitioning wall included substantially within said outer wall and separating the interior of said body into an outer main steam shredding blast conduit intermediate of said inner and outer walls and outside of said inner wall and an auxiliary steam shredding blast conduit intermediate of said inner and outer walls and within each of said walls, a rear wall having an auxiliary steam inlet means in communication with said adhesively treated auxiliary steam conduit, each of said conduits having a separate front nozzle portion, the nozzle portion of said adhesively treated auxiliary steam conduit having a perforated front wall, in contact with the front portion of said inner wall, said outer and inner walls forming a longitudinally extending side wall portion of each of said blast conduits and said rear wall forming a rear end portion of said steam blast nozzle means and of each of said conduits.

6. In the manufacture of adhesively treated mineral wool fibers shredded from suitable molten materials by a main steam shredding blast and treated at the time of fiber formation with an adhesively treated auxiliary steam blast other than said main steam shredding blast, a steam blast nozzle means comprising a rigid recessed body having a longitudinally extending peripheral outer wall provided with a steam inlet means, a longitudinally extending inner partitioning wall included substantially within said outer wall and separating the interior of said body into an outer main steam shredding blast conduit intermediate of said inner and outer walls and outside of said inner wall and an auxiliary steam shredding blast conduit intermediate of said inner and outer walls and within each of said walls, a rear wall having an auxiliary steam inlet means in communication with said adhesively treated auxiliary steam conduit, each of said conduits having a separate front nozzle portion and being positioned within and to the rear of the front edge of said outer wall in contact with the front portion of said inner wall, said outer and inner walls forming a part of each of said blast conduits and said rear wall forming a rear portion of said steam blast nozzle means and of each of said conduits.

7. In the manufacture of adhesively treated mineral wool fibers shredded from suitable molten materials by a main steam shredding blast and treated at the time of fiber formation with an adhesively treated auxiliary steam blast other than said main steam shredding blast, a steam blast nozzle means comprising a rigid recessed body having a longitudinally extending peripheral outer wall provided with a steam inlet means, a longitudinally extending inner partitioning wall included substantially within said outer wall and separating the interior of said body into an outer main steam shredding blast conduit intermediate of said inner and outer walls and outside of said inner wall and an auxiliary steam shredding blast conduit intermediate of said inner and outer walls and within each of said walls, a rear wall having an auxiliary steam inlet means in communication with said adhesively treated auxiliary steam conduit, each of said conduits having a separate front nozzle portion, the nozzle portion of said adhesively treated auxiliary steam conduit including a perforated front wall and being positioned within and to the rear of the front edge of said outer wall in contact with the front portion of said inner wall, said outer and inner walls forming a part of each of said blast conduits and said rear wall forming a rear portion of said steam blast nozzle means and of each of said conduits.

DANIEL C. DRILL.